United States Patent [19]

Ohtomo et al.

[11] 4,039,484
[45] Aug. 2, 1977

[54] PROCESS FOR THE PRODUCTION OF ANION-EXCHANGEABLE NONHOLLOW NOVOLAK FILAMENTS

[75] Inventors: Koichiro Ohtomo, Takatsuki; Taro Murata, Settsu, both of Japan

[73] Assignee: Kanebo, Ltd., Tokyo, Japan

[21] Appl. No.: 631,236

[22] Filed: Nov. 12, 1975

Related U.S. Application Data

[63] Continuation of Ser. No. 343,793, June 21, 1973, abandoned.

[30] Foreign Application Priority Data

May 24, 1972 Japan .................................. 47-51893
Apr. 3, 1972 Japan .................................. 47-33282
Apr. 1, 1972 Japan .................................. 47-33042

[51] Int. Cl.² ............................................. C08G 5/18
[52] U.S. Cl. ............................. 260/2.1 C; 260/2.1 R
[58] Field of Search ......................... 260/2.1 C, 2.1 R

[56] References Cited

U.S. PATENT DOCUMENTS

| 2,521,288 | 9/1950 | Evers | 260/2.1 |
| 2,732,352 | 1/1956 | Van Blaricom et al. | 260/2.1 |
| 3,573,277 | 3/1971 | Grant | 260/231 |
| 3,652,540 | 3/1972 | Determann et al. | 260/232 |
| 3,835,072 | 9/1974 | Economy et al. | 260/2.1 |

OTHER PUBLICATIONS

37 Plastics Fabr. Uses vol. 79 p. 39 (43391b Japan Appl. Kokai 31189 4/1973).

Primary Examiner—Theodore E. Pertilla
Attorney, Agent, or Firm—Sherman & Shalloway

[57] ABSTRACT

A process for producing an anion-exchangeable nonhollow novolak filament which comprises treating a cured nonhollow novolak filament with an amination agent thereby introducing an anion-exchangeable group into the filament.

13 Claims, No Drawings

PROCESS FOR THE PRODUCTION OF ANION-EXCHANGEABLE NONHOLLOW NOVOLAK FILAMENTS

This is a continuation division of application Ser. No. 343,793, filed June 21, 1973 now abandoned.

This invention relates to a process for producing an anion-exchangeable nonhollow novolak filament, which not only retains the properties possessed by the novolak filament, such as its excellent flame-resistant and anti-fusing properties, resistance to swelling, resistance to attack by chemicals and other desirable properties, including its high anion-exchange capacity but also demonstrates outstanding performances in wide areas of applications, and particularly in the pollution prevention area. The invention also relates to ways of utilizing this filament.

As a readily available ion exchanger that demonstrates excellent ion-exchange capacity, most widely used hitherto has been a synthetic high molecular weight material whose base is the styrene-divinylbenzene polycondensation product. While the foregoing material is usually used in the form of beads, and rarely in a membranous form, it has the shortcoming that it tends to become deformed during its use. For instance, in carrying out the ion-exchange treatment by packing the foregoing beads in an ion-exchange column and passing therethrough the liquid to be treated, it is known that a pressure loss increase occurs with the passage of time as a result of the change in the form of the beads to cause clogging to take place frequently and hence hindering the passage of the liquid. With a view to circumventing this disadvantage as well as to enhance the ion-exchange capacity, there has been suggested an ion-exchangeable filament having cellulose as its base, it being claimed that in this case the surface area contacting the treated liquid on a per-unit-weight basis is increased and the ion-exchange speed is improved. However, as the proportion of the ion-exchange capacity of the cellulosebased filament is increased, there is an inevitable increase in the degree of its swelling. In consequence, there is naturally a limit to the increase in the ion-exchange capacity and moreover the increase in the ion-exchange capacity achieved is not necessarily satisfactory. Further, there is also the disadvantage that since this filament is poor in such properties as resistance to attack by chemicals, tenacity and elongation, marked limitations are imposed as to the areas in which it can be used. Again, there is a strong desire for the development of an inexpensive ion-exchangeable filament which not only excels in physical, chemical and biochemical endurance as well as resistance to change in form but also possesses excellent treatment efficiency when applied to the pollution prevention area such as the treatment of the discarded liquors of various industries, e.g., the treatment of waste liquors containing radioactive materials, the treatment of the waste liquors of various chemical industries, the treatment of the waste liquors of various mining industries and the treatment of the waste liquors of the various biochemical industries.

As a consequence of our research with a view to providing an ion-exchangeable filament which satisfies the foregoing demand and which can demonstrate excellent performances in wide areas of application including the prevention of pollution, we found that by utilizing the phenolic hydroxyl group that in chemical structure of the novolak filament it was possible to readily introduce into the novolak filament the primary, secondary and tertiary amino groups and/or the quaternary ammonium salt groups, and that these anion-exchangeable groups could be introduced into the novolak filament without sacrificing the flame-resistant and anti-fusing properties, resistance to swelling, resistance to attack by chemicals, tenacity, elongation and other desirable properties that are possessed by the novolak filament.

It was further found that the filament form has the advantages of a tremendous improvement in the speed of the ion-exchange treatment and elimination of the increase in pressure loss with the passage of time and the clogging of the system. We also found that this novolak filament excelled in its resistance to microorganisms and hence that it could be used without the imposition of any restrictions in extremely wide areas of application, including its use as an ion-exchange filter material for carrying out the purification of the products of various biochemical industries or as an ion-exchanger for the treatment of the waste liquors that are discharged or discarded in these industries. Hence, it was found that the areas in which this filament could be used could be greatly expanded.

Further, although much difficulty was expected to be experienced in introducing the anion-exchangeable group to the uncured melt-spun novolak filament by utilizing the phenolic —OH group possessed thereby if attempts were made to impart an adequate resistance to swelling thereto by curing same using an aldehyde as a curing reagent in the presence of an acidic catalyst and/or basic catalyst, it was discovered that in accordance with the present invention both an adequately high resistance to swelling and an adequately high anion-exchange capacity could be imparted to the novolak filament.

An object of the present invention is therefore to provide an inexpensive and readily produced anion-exchangeable nonhollow novolak filament which not only excels in such properties as flame-resistant and anti-fusing properties, resistance to swelling, resistance to attack by chemicals, tenacity and elongation but also demonstrates a high anion-exchange capacity. Another object is to provide such a filament in which the disadvantages such as an increase in the loss of pressure with the passage of time and clogging of the system during its use have been overcome. A further object is to provide such a filament which possesses superior durability and which has been freed from the restrictions that have been imposed as to the areas of its application, when compared with the case of the conventional ion-exchangeable filament. An additional object is to provide a process for producing such a filament.

Other objects and advantages of the invention will become apparent for the following description.

In accordance with the process of the present invention, a cured nonhollow novolak filament is treated with an amination agent, and then by utilizing principally the phenolic —OH group possessed by the novolak filament an anion-exchangeable group selected from the group consisting of the primary, secondary and tertiary amino groups and the quaternary ammonium salt groups is introduced into the filament. The so introduced amino group can then be converted to the —OH or —Cl type ion-exchangeable groups by such processes which are known per se.

The cured nonhollow novolak filament itself and the method of preparing same are known. The foregoing filament can be prepared by operating in the following manner. An uncured and fusible novolak resin is heated in a non-oxidizing atmosphere, e.g., in an atmosphere of nitrogen, to render it into a molten resin, after which the malten resin is melt-spun to form an uncured nonhollow novolak filament. The spun filament is then cured in the presence of a catalyst selected from the group consisting of an acidic catalyst and a basic catalyst, using an aldehyde as a curing reagent. For instance, the cured nonhollow novolak filament can be obtained either by curing the uncured novolak filament using an aldehyde as the curing reagent in the presence of an acidic catalyst; or by curing the uncured novolak filament using an aldehyde as the curing reagent in the presence of a basic catalyst; or by precuring the uncured novolak filament using an aldehyde as the curing reagent in the presence of an acidic catalyst and thereafter curing the precured filament with an aldehyde in the presence of a basic catalyst. It is to be understood that the terminology "curing the novolak filament using an aldehyde as a curing reagent in the presence of a catalyst selected from the group consisting of an acidic catalyst and a basic catalyst" is meant to comprehend the modes such as hereinabove described. It goes without saying that the filament may be one whose drawing treatment has been carried out at an optional step, i.e., during the time it is being wound up or after it has been wound up or after it has been cured.

The uncured and fusible novolak resin itself is well-known. It can be produced by reacting (polycondensing) a phenol with an aldehyde in the presence of an acidic catalyst. Usually, the novolak resins have a number average molecular weight of about 300 to about 2000. If desired, those having a larger molecular weight (for example, up to about 5000) can be prepared. Therefore, as is well known, the predominantly novolak-type modified novolak resins obtained by any desired combination of the novolak-type reaction and the resol-type reaction can also be used. Futhermore, any desired combinations of phenols and aldehydes can be used, and different novolak resins each derived from a different combination of phenol and aldehyde can be used conjointly. If desired, a novolak resin blended with resol resin in an amount of less than 40% by weight, for example, 0.1 to 40% by weight, based on the total amount of the novolak and resol resins, can be used. Also usable in similar amounts are the thermoplastic synthetic resins, for example, the polyamides such as nylon-6, nylon-7, nylon-9, nylon-11, nylon-12, nylon-66, nylon-610, nylon611, nylon-612, nylon-6T, nylon-11T and the copolymers consisting essentially of these polyamides; the polyesters such as polymethylene terephthalate, polyethylene terephthalate, polybutylene terephthalate, polyethylene oxyterephthalate, polycyclohexylene terephthalate and the like, and the copolymers consisting essentially of these polyesters; the polyolefins such as polyethylene, polypropylene, polystyrene, polyvinylidene chloride, polyvinyl chloride and the like, and the copolymers thereof; and the various polyurethanes. The resol resins and/or these thermoplastic synthetic resins may be used in admixture in an amount of less than 40% by weight based on the total amount of the novolak resin and the resol resin and/or thermoplastic synthetic resins.

The phenols used for producing the novolak resins are most commonly phenol and cresol. But other phenols can also be used. Examples of these phenols are phenol, o-cresol, m-cresol, p-cresol, 2,3-xylenol, 2,5-xylenol, 2,4-xylenol, 2,6-xylenol, 3,4-xylenol, 3,5-xylenol, o-ethylphenol, m-ethylphenol, p-ethylphenol, p-phenylphenol, p-tertiary butyl phenol, p-tertiary amylphenol, bisphenol A, resorcinol, and mixtures of two or more of these phenols.

The aldehyde most commonly used for polycondensing with the above phenols is formaldehyde, but paraformaldehyde, benzaldehyde, hexamethylenetetramine, furfural and mixtures thereof can also be utilized.

The acidic catalyst used for the reaction of forming the novolak resins may be any known organic or inorganic acid, for example, hydrochloric acid, nitric acid, sulfuric acid, phosphoric acid, formic acid, acetic acid, oxalic acid or phthalic acid.

The uncured melt-spun nonhollow novolak filament obtained by melt-spinning the hereinabove-described uncured novolak resin can be cured by the previously described various modes of operation to obtain the cured nonhollow novolak filament.

The cure of the uncured melt-spun filament can be performed in various ways at a temperature ranging from room temperature to 250° C. by contacting the uncured filament with a curing reagent in the presence of a catalyst. The temperature can be properly chosen within the abovementioned range according to the type and amount of the novolak resin, the type and amount of the thermoplastic synthetic resin, the denier of the filament, the way in which the cure is performed, the type and amount of the curing reagent and the like.

In a most generally preferred embodiment of the invention, the contact between the uncured filament and the curing reagent in the presence of a curing catalyst is accomplished either by immersing the melt-spun filament in a bath containing an aldehyde as a curing reagent in the presence of a catalyst or by running the filament through such a bath. The contact can also be carried out by other means such as spraying or fuming the uncured filament with a liquid containing the curing reagent and curing catalyst.

Several modes of carrying out the cure using an aldehyde as the curing reagent in the presence of an acidic catalyst will be given. For instance, in one mode, the uncured filaments are immersed in an aqueous solution of a mixture of an acidic catalyst and an aldehyde for 5 to 20 hours at a temperature ranging from about 25° to 105° C. In another mode, the filaments are immersed in an aqueous solution of the mixture, and then the solution is gradually heated up to 50° to 105° C. for about 0.5 to 5 hours. The cure may also be effected by contacting the uncured filaments with a gaseous mixture of an acidic catalyst and an aldehyde at a temperature from 30° to 105° C. It goes without saying that these procedures may be combined. The rate at which the temperature is raised is peferably not higher than 200° C. per hour.

One example of the aqueous solution of a mixture of an aldehyde and an acidic catalyst is that containing 6 to 35% by weight, and preferably 13 to 25% by weight, of the acid and 3 to 35% by weight, and preferably 13 to 25% by weight, of the aldehyde.

Several modes of carrying out the cure using an aldehyde as the curing reagent in the presence of a basic catalyst will be given. For instance, in one mode, the uncured filaments are immersed in, or caused to run through, a bath containing the aldehyde and the basic catalyst at a temperature of about 15° to 40° C. Then the temperature is gradually raised until a temperature of 40° and 105° C. is reached. The rate at which the temperature is raised should preferably not exceed 50° C. per hour. Alternatively, the uncured filaments are treated with the solution at 40° to 105° C. for 15 to 120 minutes. Needless to say, the temperature may be raised within the foregoing temperature range during the treatment. When the above-described procedures are effected under pressure, a temperature higher than 105° C. may be used. This cure may also be effected by contacting the uncured filaments with a gaseous mixture of a basic catalyst and an aldehyde at a temperature from 30° to 105° C. for 20 to 120 minutes. In this case, ammonia is usually used as the basic catalyst and formaldehyde, as the aldehyde. It is most advantageous that the cure with the basic catalyst is effected at 60° to 80° C. for 30 to 60 minutes in an aqueous solution of formaldehyde and ammonia.

The concentrations of the aldehyde and the basic catalyst are varied depending upon the treating temperature, treating time and the like. Usually, the concentration of the aldehyde is 1 to 60% by weight, preferably 12 to 45% by weight, and most preferably 20 to 35% by weight, and the concentration of the basic catalyst is usually 0.2 to 20% by weight, preferably 1 to 10% by weight, and most preferably 2 to 5% by weight.

It is also possible to cure the uncured filament by a procedure of precuring the uncured filament with an aldehyde as a curing reagent in the presence of an acid catalyst and thereafter cure the precured filament with an aldehyde in the presence of a basic catalyst. In this case the two steps may be carried out by suitably selecting and combining the same conditions as hereinbefore indicated for the respective cases.

Formaldehyde is used most commonly as the aldehyde to be used as the curing reagent in the aforementioned curing step, but paraformaldehyde, benzaldehyde, hexamethylenetetramine, furfural and mixtures thereof may also be utilized.

The acidic catalyst used in the curing step may be any known inorganic and organic acids such as hydrochloric acid, sulfuric acid, nitric acid, acetic acid, oxalic acid, formic acid, orthophosphoric acid, butyric acid, lactic acid, benzenesulfonic acid, p-toluenesulfonic acid or boric acid. Mixtures of these acids may also be used.

The basic catalyst used in the curing step may be ammonia, ammonium hydroxide and the amines, e.g., monoethanolamine and triethyleneamine, and a hydroxide or carbonate of a metal selected from the group consisting of the alkali metals and alkaline earth metals, e.g., sodium hydroxide, potassium hydroxide, calcium hydroxide, barium hydroxide or sodium carbonate, and the mixtures thereof. Hexamethylenetetramine can be used not only as a curing reagent but also as a basic catalyst.

Thus, a cured nonhollow novolak filament is obtained. In the invention process, the novolak filament is treated with an amination agent either at the same time the cure is being carried out or after completion of the cure. Hence, it is to be understood that the terminology "treating the cured nonhollow novolak filament with an amination agent" is meant to include also the case where the amination treatment is carried out at the same time the cure is being carried out.

Various modes of operation may be employed in carrying out the invention process. Several typical modes will be described hereinafter. In the invention process, the cured nonhollow novolak filament is introduced with the primary, secondary and tertiary amino groups and quaternary ammonium salt groups by treating the filament with an amination agent utilizing principally the phenolic -OH group possessed by the foregoing filament. Hence, it will be appreciated by those skilled in the art that various modifications and combinations can be made without departing from the spirit and scope of the invention, and hence the invention is not to be limited to the modes given below except as set forth in the appended claims.

According to one mode of operating the invention process, the uncured melt-spun nonhollow novolak filament is precured using an aldehyde as a curing reagent in the presence of an acidic catalyst, and thereafter the precured filament is cured with an aldehyde in the presence of a basic catalyst followed by submitting the so obtained cured nonhollow novolak filament to a treatment with a halo-alkylation agent. Alternatively, the foregoing precuring treatment or precuring and curing treatments can be carried out in the copresence of a lower aliphatic alcohol, e.g., a $C_1 - C_4$ alcohol, and then the so obtained cured nonhollow novolak filament can be treated with an amination agent selected from the group consisting of ammonia and the amino compounds having at least one amino group selected from the class consisting of the primary, secondary and tertiary amino groups.

In carrying out the invention process by this mode, it is preferred that the degree of cure of the precured novolak resin is about 20 - about 80%, and preferably about 30 - about 60%. The degree of cure is determined in the following manner. The weight (grams) of a sampled precured novolak filament is measured, and then the filament is extracted for 3 hours with methanol at its boiling point, using a Soxhlet extractor, to remove the uncured portion by extraction. The filament is again weighed, and the degree of cure is obtained as follows:

$$\text{Degree of cure (\%)} = \frac{\text{Weight (g) of precured novolak filament after extraction}}{\text{Weight (g) of precured novolak filament before extraction}} \times 100$$

According to this mode, a halo-alkyl group is introduced into the molecule of the cured nonhollow novolak filament, and then an anion-exchangeable group selected from the class consisting of the primary, secondary and tertiary amino groups and the quaternary ammonium salt groups can be introduced to the filament by treating the filament with an amination agent.

The conditions for carrying out the halo-alkylation and amination reactions can be suitably chosen. Usually, the reactions are carried out for about 0.5 - 10 hours at a temperature of 20° - 100° C. with a bath ratio of 1:10 - 1:100. Further, if necessary, the novolak resin filament may be given a swelling treatment in advance of the reaction with a swelling agent such as dioxane, acetone, methyl ethyl ketone, benzene, toluene, xylene, dimethylformamide, dimethylacetamide, nitrobenzene and chlorobenzene.

Usable as the halo-alkylation agent is a member selected from the group consisting of the monohalo-alkyl ethers having a $C_1 - C_4$ alkyl residue and the dihalo-alkyl ethers having a $C_1 - C_4$ alkyl residue. Specific examples include such as chloromethyl ether, bromomethyl ether and dichloromethyl ether.

Usable along with the foregoing halo-alkylation agent is a catalyst such as anhydrous zinc chloride, aluminum chloride and stannic chloride. In fact, the use of such a catalyst is to be preferred. After completion of the halo-alkylation treatment, the unreacted halo-alkylation agent and the catalyst are decomposed and removed with a large quantity of water. Then by using an amination agent in the form, say, of an aqueous solution, alcohol solution or an aqueous alcohol solution the amination or conversion to ammonium chloride of the filament can be accomplished.

Usable as the amination agent are ammonia, the $C_1-C_4$ monoalkylamines, $C_1-C_4$ monoalkanolamines, $C_2-C_8$ dialkylamines, $C_2-C_8$ dialkanolamines, $C_3-C_{12}$ trialkylamines, $C_3-C_{12}$ trialkanolamines, $C_2-C_9$ polyalkylenepolyamines and the N-alkyl substituted products thereof. Specific examples include ammonia, and the primary amino compounds such as monomethylamine, monoethylamine, monopropylamine and monoethanolamine; the secondary amino compounds such as dimethylamine, diethylamine, methylethylamine, dipropylamine, piperazine and diethanolamine; the tertiary amino compounds such as trimethylamine, triethylamine, triethanolamine and N,N-dimethylethanolamine; and the polyamines such as ethylenediamine, diethylenetriamine and triethylenetetramine; or the N-alkyl substituted products thereof.

According to another mode of operating the invention process, the uncured melt-spun nonhollow novolak filament is cured using an aldehyde as a curing reagent in the presence of a catalyst selected from the group consisting of an acidic catalyst and a basic catalyst, after which the so obtained nonhollow novolak filament is treated with an alkali metal salt-forming agent selected from the group consisting of preferably the alkali metal hydroxides and the aliphatic lower alcohol-alkali metal mixtures. The so treated filament can then be treated with an amination agent selected from the group consisting of the compounds of the formulas $$X + CR_1R_2 \frac{1}{n_1} N \frac{1}{m} + CR_4R_5 \frac{1}{n_2} N \diagdown \frac{R_6}{R_7} \quad (1)$$

and $$X + CR_1R_2 \frac{1}{n_1} N \frac{1}{m} + CR_4R_5 \frac{1}{n_2} \overset{R_8}{\underset{Y^-}{\overset{|}{N}}} \diagdown \frac{R_6}{R_7} \quad (2)$$

wherein X is a member selected from the group consisting of halogens, sulfuric acid ester residue and epoxy group; $R_1$, $R_2$, $R_3$, $R_4$ and $R_5$ are each a member selected from the class consisting of hydrogen and the $C_1 - C_4$ alkyl groups; $R_6$ and $R_7$ are each a member selected from the class consisting of hydrogen, the $C_1 - C_4$ alkyl groups and the group of the formula $X (CR_1R_2)_n$, where X, $R_1$ and $R_2$ are as defined above, and $n_3$ is an integer from 1 to 6, $R_8$ is a member selected from the class consisting of the $C_1 - C_4$ alkyl groups, methylol and ethylol groups; Y is hydroxyl group or halogen; $n_1$ and $n_2$ are each an integer from 1 to 6, preferably 2 to 4; and m is 0 or an inter from 1 to 3.

In carrying out the invention process by this mode of operation, the cured nonhollow novolak filament is preferably treated with an alkali metal salt-forming agent such as an alkali metal hydroxide, or carbonate, for example, NaOH, NaCO$_3$, KOH, K$_2$CO$_3$, or a mixture of an aliphatic lower alcohol, e.g., a $C_1 - C_4$ alcohol and an alkali metal, e.g., sodium or potassium and thereafter treated with the aforesaid amination agent. For instance, the filament is treated with either an aqueous NaOH solution of the order of 0.1 - 3 normality or an alcohol-alkali metal mixture containing about 0.5 - 50 grams of the alkali metal per liter of alcohol, thus converting the phenolic -OH group of the cured nonhollow novolak filament to an alkali metal salt, after which the filament can be treated with the amination agent. The treatment by means of the alkali metal salt-forming agent can be carried out for about 1 - 5 hours at a temperature of about 20° - 60° C. When the highest possible temperature is used, a treatment time on the short side should be adopted. In this method, the above described treatment is preferable but not essential. For instance, where group X represents an epoxy group in above formulas (1) and (2), such treatment may be omitted.

When the cured nonhollow novolak filament, which has been treated or not, as above described, with the alkali metal salt-forming agent, is then treated with an amination agent of the above-given formulas (1) or (2), the contact of the filament with the amination agent is preferably carried out in a polar solvent such as water, alcohol, dioxane and dimethylformamide or a nonpolar solvent such as benzene or toluene. This treatment is preferably carried out at the lowest possible temperature. For instance, a treatment for about 30 minutes - 2 hours at 0° - 50° C. should be sufficient.

As specific examples of the amination agents of formulas (1) and (2), mention can be made of the monoalkylolamine derivatives such as 1-chlorodimethylamine, 1-bromodiethylamine, 2-chloroethyleneamine, 2-chloroethylenemethylamine, 2-chloroethylenedimethylamine, 2-chloroethylenediethylamine, 2-chloroethylenedipropylamine, 2-chloroethylenedibutylamine, 3-chloropropyleneamine, 3-chloropropylenedimethylamine, 3-bromopropylenediethylamine, 4-chlorobutylenedimethylamine and 4-bromobutylenediethylamine, as well as the dialkylolamine derivatives and the trialkylolamine derivatives such as N,N-dichloroethylmethylamine and N,N,N-trichloroethylamine. Further, the condensation products such, for example, as N-2-chloroethylethylenediamine and N,N-dimethyl-N'-chloroethylethylenediamine, which are readily obtained from the foregoing compounds, or the quaternary ammonium salts thereof can be mentioned.

As still another mode of practicing the invention process, the uncured melt-span nonhollow novolak filament is cured using an aldehyde as a curing reagent in the presence of a catalyst selected from the group consisting of an acidic catalyst and a basic catalyst, following which the cured nonhollow novolak filament can be treated with an amination agent selected from the group consisting of the compounds of the formulas

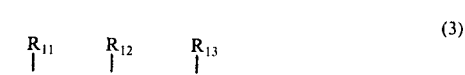

(3)

and (4)

-continued

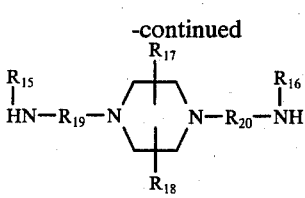

wherein $R_9$ is an alkylene group, preferably a $C_1 - C_4$ alkylene group; $R_{10}$ is an alkylene group, preferably a $C_1 - C_4$ alkylene group, when $p$ is 1, and is a member selected from the class consisting of hydrogen, the $C_1 - C_{10}$ alkyl groups and the group of the formula

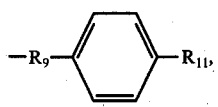

where $R_9$ is as above defined and $R_{11}$ is as hereinafter defined, and $p$ is 0; $R_{11}$, $R_{12}$, $R_{13}$, $R_{14}$, $R_{15}$, $R_{16}$, $R_{17}$ and $R_{18}$ are each a member selected from the class consisting of hydrogen and the $C_1 - C_4$ alkyl groups; $R_{19}$ and $R_{20}$ are each of the class consisting of the $C_1 - C_{10}$ methylene and polymethylene groups; $l$ is 0 or an integer from 1 to 50; and $p$ is 0 or 1, and the quaternary ammonium salts thereof at a temperature preferably of 100° – 200° C.

When the foregoing amination agent is a liquid under the above indicated conditions in which its contact is made with the nonhollow novolak filament in practicing the invention process by this mode, the treatment can be carried out by contacting it with the nonhollow novolak filament by immersion, spraying or any other optional method. On the other hand, when the amination agent is in a solid state under the above-indicated conditions in which its contact is made with the filament, the treatment can be carried out by effecting the contact of the amination agent with the filament in the former's solvent solution state, using a suitable solvent, the solution being preferably one of high concentration.

As the solvent to be used in this case, there can be named such, for example, as dioxane, tetrahydrofurane, dimethylformamide, dimethylacetamide and nitrobenzene.

The foregoing amination agents that are used in this mode not only are an anion-exchangeable group introduction agent but in many cases act also as a swelling agent of the novolak resin filament. Hence, when the amination agent is a liquid under the contacting conditions, they are best used as such. Needless to say, the solvents such as indicated above can also be used. On the other hand, as the solvent to be used when the amination agent is a solid under the contacting conditions, preferably chosen is one, such as indicated above, having a swelling action on the novolak filament, using the solvent in an amount of 10 – 50% by weight of the amination agent.

The treatment of the nonhollow novolak filament with the foregoing amination agent is preferably carried out under heating, since in this case the swelling action on the filament and the reaction speed are enhanced. Usually, a temperature of above 100° C., e.g., of the order of 100° – 200° C., can be employed, particularly preferred being a temperature of 120° – 180° C. While the reaction proceeds smoothly at temperatures exceeding 180° C., there is the possibility of the degradation of the novolak filament itself to result in the possibility of a decline of the properties of the filament as well as a reduction in the anion-exchange capacity. Hence, the choice of a temperature in the range of about 100° – 180° C. is to be preferred. The reaction can be carried out at normal atmospheric temperature or under superatmospheric pressure, there being no particular restriction in this respect.

As the amination agent of the hereinabove-given formulas (3) and (4), which are to be used in this mode of operation, preferred are the compounds having at least one tertiary amino group. Further, for enhancing the ion-exchange capacity of the resulting anion-exchangeable nonhollow novolak filament, a compound having at least three basic nitrogen atoms in its molecule is preferred. In addition, in view of the previously indicated reaction conditions and the molecular structure of the novolak filament, a compound having a molecular weight of 80 – 1000 and a boiling point of above 130° C. is to be preferred as the amination agent.

As specific examples of the amination agent of formula (3) to be used in the above-described mode of the present invention, included are the monoalkylamines as well as the diamines such as ethylene diamine, propylene diamine, hexamethylenediamine and nonamethylenediamine and the polyamines such as diethylenetriamine and triethylenetetramine and the N-alkyl substituted products thereof; typical of which are such, for example, as N,N-di(beta-aminoethyl)methylamine, N,N-di(beta-aminopropyl)ethylamine, N,N'-dimethyl-N,N'-di-beta-aminoethyl-ethylenediamine, N,N'-dimethyl-N,N'-di-gamma-aminopropyl-ethylenediamine and N,N'-diisobutyl-di-gamma-propylhexamethylenediamine. On the other hand, as examples of the amination agents of formula (4), mention can be made of such as N,N'-di(aminomethyl)-piperazine, N,N'-di(aminomethyl)-methylpiperazine, N,N'-di(beta-aminoethyl)-piperazine, N,N'-di(gamma-aminopropyl)-piperazine, N,N'-di(gamma-aminopropyl)-2,5-dimethyl-piperazine and N-(gamma-aminopropyl)-N'-(aminomethyl)piperazine. Also usable in like manner are the diamines obtained by the aminoalkylation of the glycols, e.g., the benzene ring-containing diamines such as bis-1,2(gamma-aminopropoxy)-ethane or xylidenediamine. In addition, usable in like manner are the quaternary ammonium salt type of amino compounds of the foregoing amino compounds.

The novolak filament introduced with either a primary, secondary or tertiary amino group by one of the above-described several modes of introducing the amino group according to the present invention can now be converted into a novolak filament introduced with a quaternary ammonium group by the quarternarizing treatment which per se is known. For instance, the novolak filament introduced with a tertiary amino group can be very readily converted to a strongly basic anion-exchangeable nonhollow novolak filament by treating the former filament with a quaternarizing agent such as dimethyl sulfate, diethyl sulfate, a methyl halide or an ethyl halide at a temperature of 0° – 80° C. for 10 minutes – 3 hours. Further, if necessary, the so obtained filament can be transformed into a hydroxyl type by treating it with an aqueous solution of a caustic alkali such as caustic soda or caustic potash, or it can be transformed into a chloro type by treatment, say, with sodium chloride or potassium chloride.

Thus, an ion-exchangeable nonhollow novolak filament having a high rate of strength retention during swelling can be provided by the invention process.

Further, it is possible to obtain filaments having the desired rate of strength retention during swelling by varying the degree of cure of the novolak filament that was described previously is connection with the first mode by controlling the degree of cure that the uncured as-spun novolak filament is given. In general, since the elongation of the filament drops somewhat with a rise in the degree of cure, a filament having an elongation and strength retention rate during swelling most suited for the use to which it is intended can be obtained by a suitable choice of the degree of cure of the intended filament. Again, it is possible to provide an anion-exchange nonhollow novolak filament demonstrating a high exchange capacity of about 2-8 meg/g by a suitable choice of the means of introducing the anion-exchangeable group, for example, the class of the amination agent, the introduction conditions, etc., along with the foregoing conditions. A novolak filament conjointly possessing the numerous excellent properties hereinbefore described is provided.

The anion-exchangeable nonhollow novolak filament of the present invention can be of various forms such, for example, as a continuous filament, staple fiber, tow, yarn, knit and woven fabrics, nonwoven fabrics and the like.

The following examples are now given for more fully illustrating the invention.

EXAMPLE 1

1410 grams of phenol, 1180 grams of formalin (aqueous 37% solution) and 20 grams of oxalic acid were reacted for 5 hours at 80° C. with stirring. After completion of the reaction, the reaction mixture was neutralized by adding sodium hydroxide, and the resulting novolak resin was washed several times in hot water. This was followed by distilling off the unreacted product and water under reduced pressure, thus obtaining a novolak resin having a numer of average molecular weight of 960. (The molecular weight was determined by a vapor osmometer manufactured by Knauer Company, West Germany).

The so obtained novolak resin was melt-spun at a melting temperature of 152°-150° C. in a stream of nitrogen, using a spinneret having four holes each 2.0 mm in diameter and wound up at a winding speed of 1050 meters per minute. The resulting uncured nonhollow novolak filament had a denier number of 15.5, a tenacity of 0.01 g/d and an elongation of 0.54%.

The so obtained uncured nonhollow novolak filament was dipped at 25° C. in a combined aqueous solution of 17.5 weight % hydrochloric acid and 18/5 weight % formaldehyde, after which the temperature of the solution was immediately raised up to 90° C. during a period of one hour. The novolak filament precured in this manner was washed in hot water and thereafter treated for 3 hours at 80° C. in a bath containing a combined aqueous solution of 2.8 weight % of ammonia and 33.3 weight % of formaldehyde to obtain a cured nonhollow novolak filament.

Next, by following the invention process, to 100 grams of the filament were added 5000 grams of chloromethyl ether and then 100 grams of anhydrous stannic chloride, following which the reaction was carried out for 2 hours at 0°-5° C. After completion of the reaction, the filament was withdrawn and thoroughly washed with water. The filament was then dried at 40° C. under reduced pressure, and thereafter the weight and chlorine content (%) were determined. The results are shown in the hereinafter given Table 1.

The foregoing chloromethylated novolak filament was then dipped in a 10 weight % methanol solution of triethylamine (amination agent) using a bath ratio of 1 : 1000 and reacted for 5 hours at a temperature of 50° C. After completion of the reaction, the filament was withdrawn and dipped for 10 hours at room temperature in an aqueous 1/10 N-NaOH solution, whereupon a hydroxyl group type strongly basic anion-exchangeable filament was synthesized. After thorough washing in water and drying, the filament was dipped at room temperature in an aqueous 1N-NaCl solution at a bath ratio of 1 : 200, after which its exchange capacity was measured by neturalizing and titrating it in 1/10 N-HCl using a phenolphthalein indicator. Further, the nitrogen content is also shown together in the hereinafter given Table 1.

Next, for measuring the capacity of this filament for adsorbing the chromic acid ions, the Cl type of the invention product was packed in an amount of 100 cc at a packing density of 0.25 grams/cc in a glass column 25 mm in diameter × 800 mm high having cocks at both the top and bottom thereof. Then a 200 ppm aqueous solution of potassium bichromate was passed through the column at the rate of 300 cc per minute, after which the content of chromic acid ions in the treated water was quantitatively analyzed, with the results shown in Table 1.

Table 1

| | After chloromethylation | | Anion-exchangeable nonhollow novolak filament | | Concentration of potassium bichloromate of treated aqueous solution (ppm) | | | | | |
|---|---|---|---|---|---|---|---|---|---|---|
| | Weight | Cl content | Exchange capacity | N content | Amount of liquid passed (l) | | | | | |
| No. | (gr) | (wt%) | (meq/g) | (wt%) | 2 | 5 | 10 | 20 | 30 | 50 |
| Ex. 1 | 112 | 7.8 | 1.7 | 2.94 | 0 | 0 | 0 | 0.3 | 3.1 | 19.5 |

EXAMPLE 2

A cured nonhollow novolak filament obtained in Example 1 was chloromethylated as described in Example 1 and thereafter reacted for 3 hours at a temperature of 45° C. in a 30% ethanol solution of triethylenetetramine using a bath ratio of 1 : 100. The filament was then withdrawn from the bath, water-washed and dried, after which it was treated with an aqueous 1/10 N-NaOH solution to obtain a hydroxyl group type filament. Next, the resulting filament, after thorough water-washing and drying, was dipped for 10 hours at room temperature in an aqueous 1/10 N—HCl solution using a bath ratio of 1 : 100 with stirring. The exchange capacity thus measured was 3.5 meq/g.

EXAMPLES 3 - 7

A tow prepared from the uncured novolak filament obtained in Example 1 was divided into five portions, each of which was then dipped at 25° C. in a combined aqueous solution of 17.5 weight % of hydrochloric acid and 18.5 weight % of formaldehyde using a bath ratio of 1 : 100, following which the temperature of the bath was raised up to 80° C. during the periods indicated in Table 2. After carrying out the reaction for a further 20 minutes at 80° C., the sample filaments were withdrawn from the bath, followed by waterwashing and drying. This was followed by extracting the sample filaments for 3 hours with methanol using Soxhlet extractor. The degree of cure (%) was then obtained by measuring the weight decrease of the sample filaments.

On the other hand, the several portions of the cured filaments were treated for 3.5 hours at 3.5 hours at 80° C. in a combined aqueous solution of 3 weight % of ammonia and 35 weight % of formaldehyde using a bath ratio of 1 : 100 to obtain cured nonhollow novolak filaments.

Next, to 10 grams of the several filament portions were added 100 grams of chloromethyl ether and then 3 grams of anhydrous aluminum chloride, following which the reaction was carried out for 5 hours at 5° - 10° C. with stirring. After completion of the reaction, the yarns were withdrawn and, after thorough waterwashing and drying, were dipped in an aqueous 30% solution of trimethylamine (amination agent) using a bath ratio of 1 : 50 and reacted with stirring. After completion of the reaction, the samples were waterwashed and dried. The samples were then prepared into the Cl type and thereafter were measured for their exchange capacity in customary manner using an aqueous N—Na$_2$SO$_3$ solution.

Separately, the mercury adsorption capacity of the several Cl type filaments were determined in the following manner. The sample filaments were placed in an aqueous solution of 0.02 mol/liter of mercuric chloride using a bath ratio of 1 : 100 and immersed therein for 2 hours at 25° C. with shaking. The mercury concentration of the supernatant liquid was determined by chelatometry to obtain the adsorption capacity. The results are shown in Table 2.

Table 2

| No. | Reaction* time (hrs.) | Degree of cure (%) | Exchange capacity (meq/g) | Mercury adsorption capacity (m-mol/g) | Filament properties Tenacity (g/d) | Filament properties Elongation (%) |
|---|---|---|---|---|---|---|
| Ex. 3 | 2.0 | 21 | 2.0 | 1.1 | 0.8 | 13.5 |
| Ex. 4 | 2.5 | 33 | 2.2 | 1.3 | 1.0 | 15.1 |
| Ex. 5 | 3.0 | 51 | 2.1 | 1.2 | 1.1 | 16.2 |
| Ex. 6 | 3.5 | 62 | 1.9 | 1.0 | 1.3 | 16.8 |
| Ex. 7 | 4.0 | 79 | 1.5 | 0.7 | 1.4 | 17.2 |

*The time required for raising the bath temperature up to 80° C. after dipping the uncured novolak filament in the hydrochloric acid-formaldehyde system at a temperature of 25° C.

EXAMPLES 8 - 17

The procedure described in Examples 3 - 7 was followed except that the class of amination agent was varied. The intended filaments having the exchange capacity, mercury adsorption capacity and filament properties shown in the following Table 3 were obtained.

Table 3

| No. | Amination agent | Degree of cure (%) | Exchange capacity (meq/g) | Mercury adsorption capacity (m-mol/g) | Filament properties Tenacity (g/d) | Filament properties Elongation (%) |
|---|---|---|---|---|---|---|
| Ex. 8 | diethylamine | 33 | 2.3 | 1.1 | 1.2 | 25.2 |
| Ex. 9 | monopropylamine | 33 | 1.7 | 0.6 | 1.3 | 23.1 |
| Ex. 10 | monoethanolamine | 33 | 1.6 | 0.6 | 1.3 | 22.1 |
| Ex. 11 | triethanolamine | 33 | 1.9 | 0.8 | 1.2 | 21.0 |
| Ex. 12 | ethylenediamine | 33 | 2.2 | 0.9 | 1.3 | 17.5 |
| Ex. 13 | diethylenetriamine | 21 | 3.2 | 1.2 | 1.0 | 13.2 |
| Ex. 14 | N,N-dimethylethylenediamine | 21 | 2.6 | 1.3 | 1.1 | 15.0 |
| Ex. 15 | N,N-dimethylpropylene-diamine | 21 | 2.4 | 1.2 | 1.0 | 13.1 |
| Ex. 16 | N,N'-(γaminopropyl)piperazine | 21 | 2.7 | 1.1 | 0.9 | 15.2 |
| Ex. 17 | polyethyleneimine (PEI-6 produced by Dow Chemical Co.) | 21 | 3.2 | 1.3 | 0.8 | 11.2 |

EXAMPLE 18

1410 grams of phenol, 1180 grams of formalin (aqueous 27 % solution), 30 grams of oxalic acid and 300 grams of methanol were reacted for 23 hours by heating with stirring at 100° C., after which the reaction was terminated by the addition of a large quantity of cold water. The resulting phenolic resin was dissolved in methanol, and the unreacted phenol, formaldehyde and methanol, along with some water, were distilled off by heating the solution under reduced pressure to thus obtain a heat-fusible novolak resin having a number average molecular weight of 820.

500 grams of the so obtained novolak resin was ground coarsely and, after thorough drying, charged to a stainless steel externally heated type melter having a capacity of one liter. After repeatedly purging the interior of the melter with nitrogen, the resin was melted at an internal temperature of 160° C. This molten novolak resin was then extruded externally of the system at the rate of 3 grams per minute from a spinneret heated at 160° C. and having 180 holes of a diameter 2.5 mm via a gear pump at the bottom of the stainless steel melter, and the spun uncured nonhollow novolak filaments were wound up on a bobbin by means of a winder disposed 1.5 meters below the spinneret; at a spinning speed of 1050 meters per minute. Next, the filaments were cut on the bobbin and removed from the bobbin in the form of tows.

One hundred grams of the uncured nonhollow novolak filament prepared in the above manner was then dipped at 20° C. in 1 liter of a combined aqueous solution of 18 weight % of formaldehyde and 18 weight % of hydrochloric acid, and, after the lapse of 30 minutes, the temperature of the bath was raised gradually up to 95° C. during a 4-hour period, after which the reaction was continued for 5 hours at 95° C. The filament was then withdrawn from the bath and immediately washed repeatedly with cold water. After neutralizing the hydrochloric acid acidity of the filament with ammonia water, the filament was thoroughly water-washed and dried. Thus was obtained a golden colored cured nonhollow novolak filament whose tenacity was 1.3 g/d and elongation was 17.2%.

Next, the chloroethyldiethylamine hydrochloride (CEDA HCl) to be used as the amination agent was prepared in the following manner. 84 grams of diethylaminoethanol was placed in a 4-necked flask and by adding 2 liters of benzene was thoroughly mixed and dissolved therein. After cooling this solution with ice to below 5° C., 127 grams of thionyl chloride was added dropwise with a separatory funnel, after which the reaction was carried out for one hour at below 5° C. with stirring. Then the temperature was raised to 35°–40° C. and stirring was carried out intermittently for one hour, whereupon the reactants turned brown in the meanwhile and separated to the bottom. On filtering this ad washing it in benzene followed by purification 98 grams of CEDA HCl was obtained.

The so obtained CEDA HCl; was used, and the tertiary amination of the aforesaid cured nonhollow novolak filament was carried out in the following manner. Ten grams of the novolak filament was dipped for 6 hours at 25° C. in 1.5 liters of an aqueous 4% NaOH solution, after which 150 grams of CEDA HCl was added and the reaction was carried out at the same temperature for 2 hours with stirring. The filament was then withdrawn from the solution, repeatedly washed with water and thereafter washed in acetone. A part of the so obtained anion-exchangeable nonhollow novolak filament was withdrawn, dipped in an aqueous 1/10 N—NaOH solution for one hour and then thoroughly washed with water and dried. When this filament was measured for its HCl adsorption capacity by dipping it for 5 hours in an aqueous 1/10 N—HCl solution, it was 3.5 meg/g. Thereafter, the remainder of the aforesaid anion-exchangeable nonhollow novolak filament was dipped in 1.5 liters of diethyl sulfuric acid and held therein for 3 hours at 40° C. to effect the conversion of the filament into quaternary ammonium chloride. The filament was withdrawn from the bath and washed with acetone and dried. 27.0 grams of a dark brown filament was obtained. The yield was 75% based on the phenolic hydroxyl group. This filament was then dipped for a further 5 hours in 2 liters of 1/10 N HCl and converted to the Cl type quaternary ammonium salt, after which the filament was withdrawn and washed repeatedly with cold water and thereafter dried under reduced pressure to obtain a strongly basic anion-exchangeable novolak filament according to the present invention.

A 1-gram sample of the so obtained novolak filament was weighted and this was placed in an Erlenmeyer flask where the filament was immersed in 100 ml of an aqueous 1/10 N NaOH solution and shaken for 5 hours, after which the NaOH consumed was determined by titrating with an aqueous 1/10 N HCl solution. After withdrawing the sample, it was thoroughly water-washed and dried under reduced pressure. Next, the sample was similarly dipped in 1/10 N HCl with shaking, and the HCl consumed was determined. The results obtained are shown in Table 4. Further, the content of the nitrogen are also shown together in Table 4.

Table 4-1

| Filament properties | | Cl type → OH type | | OH type → Cl type | | |
|---|---|---|---|---|---|---|
| Tenacity (g/d) | Elongation (%) | Immersion time (hr) | Exchange capacity (meq/g) | Immersion time (hr) | Exchange capacity (meq/g) | Nitrogen content (wt%) |
| 1.2 | 15.7 | 5 | 3.1 | 5 | 3.2 | 4.7 |

As is apparent from Table 4-1, it can be seen that the anion-exchangeable filament of the present invention has a sufficiently great exchange capacity and that this has been achieved with no degradation whatsoever of the properties possessed by the original filament.

Next, the following experiment was conducted for comparing the adsorption speed of the chromic acid ions. The Cl type of the foregoing samples was used for the test.

A glass column 30 mm in diameter and 1000 mm high equipped with cocks at its top and bottom was packed with the sample in an amount of 3000 ml at a packing density of 0.3 g/ml.

An aqueous solution containing 100 ppm of the chromic acid ions was then passed through the packed column at the rate of 900 ml per minute to remove the chromic acid ions. When the concentration of the chromic acid ions of the treated liquid was measured, the results shown in Table 4-2 were obtained.

Table 4-2

| Treatment time (min) | | | | |
|---|---|---|---|---|
| 10 | 30 | 90 | 150 | 300 |
| 0 | 0 | 0 | 3 | 100 |

It can be seen from the results of TAble 4-2 that the anion-exchangeable filament of the present invention possesses an exceedingly great exchange capacity and also that the adsorption speed is great to make it possible to carry out the treatment at high speed. When its regeneration was carried out in customary manner and the test was repeated, it was found to excel in durability, there being no reduction in adsorption capacity and weight nor any change in the properties of the filament.

EXAMPLE 19

Chloroethyldimethylamine hydrochloride was obtained as in Example 18, using dimethylaminoethanol. After dissolving this chloroethyldimethylamine hydrochloride in water, an equivalent amount of caustic soda was added to free the chloroethyldimethylamine, which was salted out and then extracted with benzene. The product was further purified by means of distillation. The boiling point of the product was 72° C.80 mmHg.

On the other hand, 10 grams of a cured novolak filament was dipped in 1.5 liters of a methanol solution containing 120 grams of sodium ethylate. The filament was held therein for 6 hours at 65° C. Thus a sodium salt of the cured novolak filament was prepared. Next, after withdrawing the filament form the solution and washing with methanol, it was dipped in 1.5 liters of benzene. While maintaining the liquid temperature at 25° C., the amination agent chloroethyldimethylamine obtained as hereinabove described, was added in an amount of 68 grams, following which stirring of the solution was continued for 3 hours at the same temperature. After completion of the reaction, the filament was withdrawn and, after washing with methanol, dipped for 3 hours in 1.5 liters of dimethylsulfuric acid at room temperature. The filament was then withdrawn from the bath, washed with acetone and dried. The filament was further dipped in a 3% saline solution and converted to a Cl type quaternary ammonium salt. After withdrawing the filament from the bath, it was thoroughly washed with cold water and dried under reduced pressure. 16.5 grams of a dark brown anion-exchangeable nonhollow novolak filament was obtained. The yield was 60% based on the phenolic hydroxyl group.

When the exchange capacity of the so obtained filament was determined by operating as in Example 18, the results shown in Table 5 were obtained.

Table 5

| Filament properties | | Cl type → OH type | | OH type → Cl type | | |
|---|---|---|---|---|---|---|
| Tenacity (g/d) | Elongation (%) | Immersion time (hr) | Exchange capacity (meq/g) | Immersion time (hr) | Exchange capacity (meq/g) | N content (wt%) |
| 1.2 | 15.9 | 5 | 2.9 | 5 | 3.0 | 4.5 |

As is apparent from Table 5, it can be seen that it is possible in accordance with the invention process to produce an anion-exchangeable filament having a superior exchange capacity without causing hardly any change in the properties of the filament.

Further, 1 gram of the foregoing Cl type anion-exchangeable filament was dipped for 6 hours in 100 ml of an aqueous 1 $Na_2SO_4$ solution with shaking, after which the exchanged and freed chlorine ions were titrated by the Mohr method. The exchange capacity of the filament was 2.5 meq/g. This proves that the invention anion-exchangeable filament is also fully effective in decomposing the neutral salts.

EXAMPLE 20

A quaternarized product of chloroethyldimethylamine was obtained by reacting the chloroethyldimethylamine prepared in Example 19 with an equimolar quantity of methyl iodide.

Next, 5 grams of the cured novolak filament prepared in Example 18 was dipped for one hour at 45° C. with shaking in one liter of an aqueous 5% KOH solution, after which 50 grams of the quaternarized product prepared as described above was added and reacted for 3 hours at 30° C. with stirring The filament was then withdrawn from the bath and thoroughly washed with water and thereafter the ions exchanged were quantitatively analyzed in customary manner, with the consequence that the filament was found to have an exchange capacity of 2.5 meq/g. Further, this strongly basic anion-exchangeable filament had an excellent capacity of decomposing neutral salts.

EXAMPLES 21-27

Example 18 was repeated ecept that the class of amination agents was varied. As a result, intended filaments having the filament properties and exchange capacities shown in Table 6, below, were obtained.

Table 6

| No. | Amination agent | Filament properties | | Cl type → OH type | | OH type → Cl type | |
|---|---|---|---|---|---|---|---|
| | | Tenacity (g/d) | Elongation (%) | Immersion time (hrs.) | Exchange capacity (meq/g) | Immersion time (hrs.) | Exchange capacity (meq/g) |
| Ex. 21 | chloromethyldiethylamine | 1.3 | 14.2 | 5 | 2.3 | 5 | 2.4 |
| Ex. 22 | 3-chloropropylenedimethylamine | 1.2 | 15.0 | 5 | 2.0 | 5 | 2.2 |
| Ex. 23 | N,N-dichloroethylmethylamine | 1.1 | 12.3 | 5 | 2.1 | 5 | 2.2 |
| Ex. 24 | N,N,N-trichloroethylamine | 1.0 | 9.7 | 5 | 2.0 | 5 | 2.1 |
| Ex. 25 | N,N-dimethyl N'-chloroethylenediamine | 1.0 | 9.2 | 5 | 2.7 | 5 | 2.9 |
| Ex. 26 | N-glycidyldimethylamine | 1.2 | 13.1 | 5 | 1.8 | 5 | 1.9 |
| Ex. 27 | diethylaminoethylenesulfate | 1.1 | 14.2 | 5 | 1.2 | 5 | 1.3 |

EXAMPLES 28 – 32

One hundred grams of the uncured nonhollow novolak filament prepared as in Example 18 was dipped at 20° C. in each of the five vessels containing a combined aqueous solution of 18 weight % of formaldehyde and 18 weight % of hydrochloric acid and, after the lapse of 30 minutes, the internal temperature of each vessel was gradually raised up to 95° C. during a 3-hour period. Thereafter the curing reaction was carried out by holding the temperature at 95° C. for a further 3, 5, 10, 15 and 20 hours, respectively. After completion of the reaction, each of the filaments were withdrawn and immediately washed repeatedly with cold water followed by neutralizing their hydrochloric acid acidity with ammonia water, thorough water-washing and drying to obtain in each case the intended filament of golden color.

Next, the foregoing five classes of cured nonhollow novolak filaments were dipped in amounts of 5 grams each in 600 ml of triethylenetetramine and reacted in each case for 5 hours at 130° C. After completion of the reaction, the several filaments were withdrawn from their baths, washed in methanol and dried. Thus were obtained five classes of weakly basic anion-exchangeable filaments.

For comparing the ion-exchangeable capacities of these filaments, the following experiment was carried out.

The samples consisted of the following five classes.

Example 28: The anion-exchangeable filament derived from the novolak filament cured for 3 hours.

Example 29: The anion-exchangeable filament cured for 5 hours.

Example 30: The anion-exchangeable filament cured for 10 hours.

Example 31: The anion-exchangeable filament cured for 15 hours.

Example 32: The anion-exchangeable filament cured for 20 hours.

About one gram of each of the foregoing five classes of dried smaples was weighed and placed in an Erlenmeyer flask, wherein each sample was kept dipped for 5 hours with shaking in 100 ml of an aqueous 1/10 N HCl solution, following which the amount of HCl consumed was titrated with an aqueous 1/10 N NaOH solution. The results obtained are shown in Table 7.

The filament properties and the nitrogen content are also shown in Table 7.

Table 7

| Sample | Filament properties Tenacity (g/d) | Elongation (%) | N content (wt%) | HCl adsorption Immersion time (hrs.) | Exchange capacity (meq/g) |
|---|---|---|---|---|---|
| Ex. 28 | 1.2 | 25 | 4.3 | 5 | 1.7 |
| Ex. 29 | 1.3 | 20 | 7.6 | 5 | 3.9 |
| Ex. 30 | 1.3 | 18 | 8.7 | 5 | 4.4 |
| Ex. 31 | 1.4 | 17 | 8.3 | 5 | 4.2 |
| Ex. 32 | 1.4 | 17 | 6.8 | 5 | 2.3 |

Thus, it can be seen from Table 7 that a curing time of 5 to 15 hours is most suitable for curing the uncured novolak filament.

EXAMPLES 33 – 39

The following experiment was carried out for investigating the most suitable temperature for conducting the reaction between the cured nonhollow novolak filament and triethylenetetramine. Five grams of the cured novolak filament prepared in Example 30 by curing for 10 hours was dipped in 600 ml of triethylenetetramine. Seven samples thus dipped are then reacted for 5 hours at temperatures ranging from 80° to 230° C. After completion of the reaction, the filaments were withdrawn, washed with methanol and dried. On measurement of the HCl adsorption of these seven classes of weakly basic anion-exchangeable filaments by the hereinbefore-described method, the results shown in Table 8 were obtained.

Table 8

| Sample | Reaction temperature with triethylenetetramine (° C.) | Filament properties Tenacity (g/d) | Elongation (%) | N content (wt%) | HCl adsorption Exchange capacity (meq/g) |
|---|---|---|---|---|---|
| Ex. 33 | 80 | 1.3 | 19 | 2.5 | 0.9 |
| Ex. 34 | 100 | 1.3 | 19 | 7.8 | 3.9 |
| Ex. 35 | 125 | 1.3 | 19 | 8.9 | 4.7 |
| Ex. 36 | 150 | 1.3 | 19 | 8.3 | 4.2 |
| Ex. 37 | 180 | 1.2 | 20 | 7.9 | 4.1 |
| Ex. 38 | 200 | 1.1 | 20 | 6.5 | 2.8 |
| Ex. 39 | 230 | 0.9 | 22 | 4.2 | 1.5 |

From Table 8, it can be seen that a temperature ranging preferably from 100° to 200° C., and most preferably from 120° to 180° C., is most suitable as the reaction temperature. Further, it also can be seen that the invention anion-exchangeable filament has an exceedingly great exchange capacity.

EXAMPLE 40

Five grams of the cured nonhollow novolak filament prepared as in Example 30 and cured for 10 hours was dipped in 600 ml of an amination agent N,N'-dimethyl-N,N'-di-gamma-aminopropyl-ethylenediamine and reacted by stirring for 5 hours while maintaining a temperature of 130° C. After completion of the reaction, the filament was withdrawn from the bath, washed with methanol and dried. The amount of HCl adsorption of the so obtained weakly basic anion-exchangeable filament was then measured as in Example 30. It was found to have a very large exchange capacity as in the case of the filament of Example 30, the exchange capacity being 4.6 meg/g.

Next, the reaction for converting this weakly basic anion-exchangeable filament to a quaternary ammonium salt was carried out. That is, 4 grams of the filament was dipped in 500 ml of diethylsulfuric acid and reacted for 4 hours at 60° C. After completion of the reaction, the filament was withdrawn from the bath, washed with acetone and dried under reduced pressure to obtain the intended strongly basic anion-exchangeable filament.

The following experiment was conducted for determining the exchange capacity of this strongly basic anion-exchangeable filament. After weighing about one gram of filament, it was dipped in 100 ml of an aqueous 1/10 N NaOH solution and shaken for 5 hours, following which the amount of NaOH consumed was titrated with an aqueous 1/10 N HCl solution. The filament was then withdrawn from the bath and thoroughly washed with water and dried.

Next, this was again weighed and then dipped and shaken in similar manner in an aqueous 1/10 N HCl solution for 5 hours, after which the amount of HCl consumed was titrated with 1/10 N NaOH. The results are shown in Table 9.

Table 9

| Filament properties Tenacity (g/d) | Elongation (%) | N content (wt%) | Exchange capacity on dipping in 1/10 N NaOH (meq/g) | Exchange capacity on dipping in 1/10 N HCl (meq/g) |
|---|---|---|---|---|
| 1.30 | 19 | 8.5 | 3.6 | 4.2 |

As is apparent from Table 9, the anion-exchangeable filament obtained by the invention process has an exceedingly great exchange capacity. In addition, its neutral salt decomposing capacity is also great.

EXAMPLE 41

Five grams of the cured novolak filament used in Example 40 was dipped in 600 ml of an amination agent N,N'-di(gamma-aminopropyl)-piperazine and reacted for 5 hours at 130° C. with stirring. After completion of the reaction, the filament was withdrawn from the bath, washed with methanol and dried. The novolak filament was then dipped in 600 ml of dimethylsulfuric acid and reacted for 4 hours at room temperature. The filament was then withdrawn from the bath, washed repeatedly with acetone and dried to obtain a strongly basic anion-exchangeable filament.

Next, about one gram of the so obtained anion-exchangeable filament was weighed and, after dipping this filament for 5 hours in 100 ml of an aqueous 1/10 N NaOH solution, the amount of NaOH consumed was determined by titration with an aqueous 1/10 N NCl solution. The filament was then withdrawn from the bath, thoroughly washed with water and dried under reduced pressure.

Next, this filament was similarly dipped with shaking in 1/10 N NaCl, and the amount of NaOH formed was determined. The results obtained are shown in Table 10.

Table 10

| Filament properties | | | Exchange capacity on dipping in 1/10 N NaOH (meq/g) | Exchange capacity on dipping in 1/10 N HCl (meq/g) |
|---|---|---|---|---|
| Tenacity (g/d) | Elongation (%) | N content (wt%) | | |
| 1.3 | 18 | 8.4 | 3.4 | 3.5 |

It can be seen from Table 10 that the exchange capacity of this anion-exchangeable filament is very great. In addition, its capacity to decompose neutral salts was also great. Further, when regeneration tests were conducted repeatedly in customary manner, no changes were noted at all in the adsorption capacity and the form of the filament, etc., and hence, the excellence of the durability of this filament was demonstrated.

EXAMPLE 42

A cured novolak filament prepared as in Example 33 and cured with a curing time of 12 hours was used, and reactions were carried out with various amino compounds under conditions of a reaction time of 7 hours, a temperature of 120° - 135° C. and a bath ratio of 1 : 100. After completion of the reaction, the filaments were withdrawn from bath and, after washing in methanol and repeated washings with water, were converted to the —OH type by dipping in 1/10 N NaOH followed by water-washing and drying to obtain anion-exchangeable filaments. The exchange capacity of these filaments were measured by using an aqueous 1/10 N HCl solution. The results obtained are shown together with the filament properties in Table 11.

Table 11

| Amino compounds | Exchange capacity (meq/g) | Filament properties | |
|---|---|---|---|
| | | Tenacity (g/d) | Elongation (%) |
| propylenediamine | 0.8 | 1.3 | 17 |
| N,N-dimethylpropylene-diamine | 3.2 | 1.0 | 19 |
| quaternarized product of N,N-dimethyl-propylenediamine (OH type) | 2.6 | 1.1 | 16 |
| polyethyleneimine (molecular weight: 600) | 3.5 | 0.9 | 15 |
| polyethyleneimine (molecular weight: 1500) | 1.2 | 1.0 | 17 |

We claim:

1. A process for producing an anion-exchangeable nonhollow novolak filament which comprises curing an uncured melt-spun nonhollow novolak filament using an aldehyde as a curing reagent in the presence of a catalyst selected from the group consisting of an acidic catalyst and a basic catalyst and thereafter treating the resulting cured nonhollow filament with an amination agent selected from the compounds of the formulae

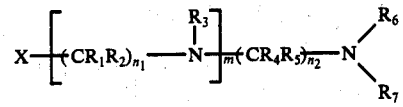

and

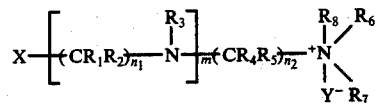

wherein X is a member selected from the class consisting of halogen, sulfuric acid ester residue and epoxy group; $R_1$, $R_2$, $R_3$, $R_4$ and $R_5$ are each a member selected from the class consisting of hydrogen and the $C_1-C_4$ alkyl groups; $R_6$ and $R_7$ are each a member selected from the class consisting of hydrogen, the $C_1-C_4$ alkyl groups and the group of the formula $X\text{-}(CR_1R_2)_{n_3}$, where X, $R_1$ and $R_2$ are as above defined, and $n_3$ is an integer from 1 to 6; $R_8$ is a member selected from the class consisting of the $C_1-C_4$ alkyl groups, methylol and ethylol groups; Y is a member of the class consisting of hydroxyl and halogens; $n_1$ and $n_2$ are each an integer from 1 to 6; and m is an integer from 0 to 3.

2. A process for producing an anion-exchangeable nonhollow novolak filament which comprises curing an uncured melt-spun nonhollow novolak filament using an aldehyde as a curing reagent in the presence of a catalyst selected from the group consisting of an acidic catalyst and a basic catalyst and thereafter treating the resulting cured nonhollow novolak filament with an amination agent selected from the compounds of the formulae

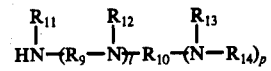

and

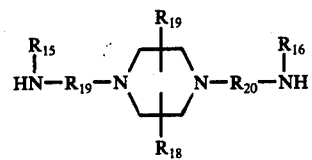

where $R_9$ is an alkylene group; $R_{10}$ is an alkylene group when p is 1, and is a member selected from the class consisting of hydrogen, the $C_1-C_{10}$ alkyl groups and the group of the formula

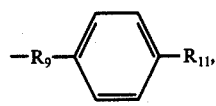

where $R_9$ is as above defined and $R_{11}$ is as hereinafter defined, when p is 0; $R_{11}$, $R_{12}$, $R_{13}$, $R_{14}$, $R_{15}$, $R_{16}$, $R_{17}$ and $R_{18}$ are each a member selected from the class consisting of hydrogen and the $C_1-C_4$ alkyl groups; $R_{19}$ and $R_{20}$ are each a member of the class consisting of the $C_1-C_{10}$ methylene and polymethylene groups; l is an integer up to 50 including 0; and p is 0 or 1; and the quaternary ammonium salts thereof.

3. The process of claim 2 which comprises effecting the treatment with said amination agent at a temperature ranging between 100° and 180° C.

4. The method of claim 1 wherein said amination agent is selected from the group consisting of 1-chlorodimethylamine, 1-bromodiethylamine, 2-chloroethyleneamine, 2-chloroethylenemethylamine, 2-chloroethylenedimethylamine, 2-chloroethylenediethylamine, 2-chloroethylenedipropylamine, 2-chloroethylenedibutylamine, 3-chloropropyleneamine, 3-chloropropylenedimethylamine, 3-bromopropylenediethylamine, 4-chlorobutylenedimethylamine, 4-bromobutylenediethylamine, N,N-dichloroethylmethylamine, N,N,N-trichloroethylamine, N-2-chloroethylethylenediamine and N,N-dimethyl-N'-chloroethylethylenediamine or the quaternary ammonium salts of these compounds.

5. The process of claim 1 which further comprises, prior to treating the cured nonhollow novolak filament with said amination agent, treating said filament with an alkali metal salt-forming agent selected from the group consisting of alkali metal hydroxide, alkali metal carbonate and a mixture of aliphatic lower $C_1$–$C_4$ alcohol and an alkali metal wherein said treatment with the alkali metal salt-forming agent is carried out for about 1 to 5 hours at a temperature of about 20°–60° C.

6. The process of claim 2 wherein said amination agent has at least one tertiary amino group, at least three basic nitrogen atoms, a molecular weight of from 80–1000 and a boiling point of above 130° C.

7. The process of claim 2 wherein said amination agent is selected from the group consisting of ethylenediamine, propylene diamine, hexamethylenediamine, nonamethylenediamine, diethylenetriamine, triethylenetetramine, N,N-di(beta-aminoethyl) methylamine, N,N-di(beta-aminopropyl)ethylamine, N,N'-dimethyl-N, N'-di-beta-aminoethyl-ethylenediamine, N,N'-dimethyl-N,N'-di-gamma-aminopropyl-ethylenediamine and N,N'-diisobutyl-di-gamma-propylhexamethylenediamine.

8. The process of claim 2 wherein said amination agent is selected from the group consisting of N,N'-di(amino-methyl)-piperazine, N,N'-di(aminomethyl)-methylpiperazine, N,N'-di(β-aminoethyl)-piperazine, N,N'-di(gamma-aminopropyl)-piperazine, N,N'-di(-gamma-aminopropyl)-2,5-dimethylpiperazine, N-(gamma-aminopropyl)-N'-(aminomethyl)-piperazine, bis-1,2 (gamma-aminopropoxy)-ethane and xylidenediamine and the quaternary ammonium salts of these compounds.

9. The process of claim 1 wherein said amination agent is chloroethyldiethylamine hydrochloride.

10. The process of claim 1 in which the amination agent is

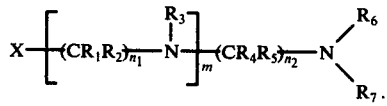

11. The process of claim 1 in which the amination agent is

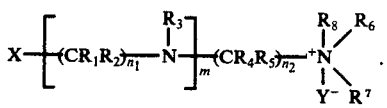

12. The process of claim 2 in which the amination agent is

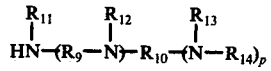

in which $R_9$ and $R_{10}$ are each independently alkylene groups of 1 to 4 carbon atoms.

13. The process of claim 2 in which the amination agent is

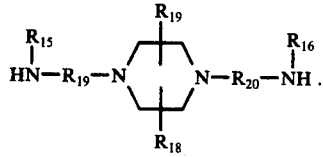

* * * * *